Aug. 4, 1970     N. R. BUCK     3,523,057

BALL AND PLASTIC ARMOUR PLATE

Filed Oct. 24, 1965

INVENTOR
*NORMAN R. BUCK*

BY *Meyers & Peterson*

ATTORNEYS

United States Patent Office 3,523,057
Patented Aug. 4, 1970

3,523,057
BALL AND PLASTIC ARMOUR PLATE
Norman R. Buck, Northfield, Minn., assignor to G. T. Schjeldahl Company, Northfield, Minn., a corporation of Minnesota
Filed Oct. 24, 1965, Ser. No. 504,324
Int. Cl. B32b 3/00
U.S. Cl. 161—116                    3 Claims

ABSTRACT OF THE DISCLOSURE

Flexible armour plate means comprising a flexible matrix film having first and second substantially parallel surfaces with a certain predetermined cross-sectional thickness, a plurality of outwardly contoured rigid members, preferably spherical, in edge-to-edge contact with each of its neighbors and being retained in the flexible matrix material, the surfaces of the rigid members being essentially entirely anti-parallel to the major surfaces of the flexible matrix, the rigid members having a dimension in a plane normal to the plane of the flexible matrix exceeding the thickness of the matrix by a factor of between about 2 and 4.

---

The present invention relates generally to an improved armour plate material, and more particularly to an improved lightweight flexible armour plate which may be used as a protective vest to protect personnel, or as a protective shielding for enclosures for aircraft or the like in order to reduce the exposure to damage or injury of personnel, materials, or supplies, due to small-arms fire, explosions, or the like.

Armour plate may be utilized for various protective purposes, primarily for reducing exposure of military or law enforcement personnel from small-arms fire. In order to be effective, the armour must be capable of stopping or decelerating bullets or other projectiles within an extremely short distance; and, in order to be effective or worthwhile as a protective vest, the material must be both light in weight and flexible. For use as a shielding in aircraft or the like, the weight factor is extremely important. Obviously, armour plates of high mass and density, while capable of absorbing the impact energy from bullets or other projectiles will be generally unsuitable for any of these applications.

Armour techniques of the present invention may employ a layer of a finely divided substance within a shell of a hard or relatively hard material, such as, for example, to absorb effectively the kinetic energy of an impacting projectile; however, these techniques have not been entirely successful. Other techniques may employ the use of a group of metallic members or the like which may be retained within a metallic matrix for assisting in the deflection of a projectile from its predetermined path upon impact.

In accordance with the present invention, a relatively thin flexible matrix film with a pair of surfaces having a central plane is adapted for retaining a plurality of rigid members therein, preferably in a regular pattern. These rigid members are in physical contact or substantially so, one with another within the pattern in the matrix. These rigid members preferably have no substantial surface area portion which is parallel to the central plane of the matrix film, the individual members being preferably partially cast within the matrix only to a certain predetermined limited extent or depth. Preferably, these rigid members are similar in configuration, one to another, and preferably have a conical or quasi-conical configuration relative to the matrix member. The depth of casting is sufficient to retain the rigid members, but is generally less than the length or height of the increasing cross sectional area of the quasi-conical members in the matrix. In other words, the individual rigid members are cast to a depth which does not exceed the point where the individual rigid members have their greatest transverse dimension. Accordingly, when the material is struck by a projectile or the like, the reaction of the protruding rigid members to this impact is to move within the matrix so as to transfer the energy of impact to adjacent or neighboring rigid members. The effect of this transfer of energy between rigid members is to permit a substantial portion of the mass of the armour material to become effective in absorbing the entire energy of impact. Since the individual members are cast to only a limited extent of their height, and since no substantial portion of the exposed surface area is parallel to the plane of the matrix film, the energy of impact is transferred so as to have a substantial component in the direction parallel to the plane of the matrix.

Preferably, the individual rigid members are in the form of spheres, although hemispheres, cones, pyramids, ellipsoids, or other outwardly contoured forms may be utilized. The preferred material of construction is porcelain or other ceramic, a relatively dense alumina having been found to be preferable. The outwardly contoured form provides a surface which will turn or deflect an approaching projectile away from a path having any component normal to the plane of the matrix, and the material used is necessarily hard enough to withstand the original force or shock delivered by the approaching projectile to the armour material. A relatively dense outwardly contoured alumina has been found to be exceptionally well adapted for this purpose, this material normally being sufficiently hard to partially disintegrate the impacting bullet. Other materials such as silicon carbide or other carbides may be utilized, however, they are generally considered to be somewhat too dense for effective use as a lightweight armour material or plate. These outwardly contoured members are effective in deflection because they will present a sufficiently hard surface to cause the approaching projectile to disintegrate, and, upon commencing to move subsequent to impact, the individual fragments are caught or otherwise trapped and the impacting energy is transferred to other portions of the armour material in an expanding substantially circular area.

Therefore, it is an object of the present invention to provide an extremely thin, flexible and lightweight armour plate which is extremely effective against small-arms fire.

It is yet a further object of the present invention to provide an extremely thin flexible armour plate which is light in weight, and which is prepared from a highly flexible plastic matrix.

It is yet a further object of the present invention to provide an improved thin flexible armour plate which is fabricated from a flexible plastic matrix, the matrix being provided with discrete hard members having an outwardly contoured surface, these discrete members being substantially in physical contact, one with another.

It is a still further object of the present invention to provide a thin flexible armour plate substance of extremely light weight, effective against small-arms fire, which utilizes a plurality of discrete hard members held in a flexible plastic matrix, these discrete hard members having a quasi-conical form and being potted or cast into the flexible matrix to a depth which is less than the depth to the point of greatest transverse area.

Other and further objects of the present invention will become apparent to those skilled in the art upon a study of the following specification, appended claims, and accompanying drawings, wherein:

Figure 1:
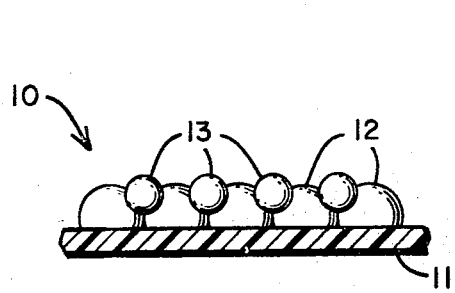
FIG. 1 is a perspective view of a thin flexible lightweight armour plate fabricated in accordance with the present invention, a portion of the armour plate being shown in a vertical section taken along the line and in the direction of the arrows 1—1 of FIG. 2.
Figure 2:
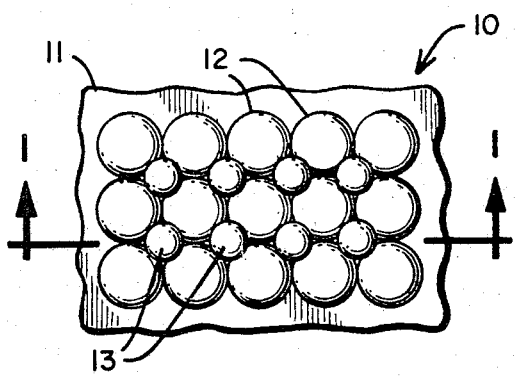
FIG. 2 is a top plan view of the armour plate shown in FIG. 1.

In accordance with the preferred modification of the present invention, particular attention is directed to FIGS. 1 and 2 wherein there is shown an armour plate generally designated 10 comprising a flexible plastic matrix member 11 along with a plurality of spherical members 12—12 and 13—13 cast therein. These individual spheres 12—12 and 13—13 are preferably fabricated from a hard substance such as dense alumina ceramic or the like. The specific gravity of this material is preferably between about 3 and 4, this providing the material having the properties desired in a preferred lightweight armour plate substance. Alumina spheres of this type are commercially available. The matrix material 11 is preferably a flexible plastic substance such as, and preferably, polyurethane having a specific gravity between about 1 and 2, and having a molecular weight sufficiently high to provide flexibility. Flexible polyurethane plastics of the type recommended are widely available commercially, one such product being sold by the E. I. du Pont Corporation of Wilmington, Del. under their code name Adiprene L. It is important to note here that each of the individual spheres is in contact with each of its neighboring spheres, and, as can be expected, making contact along equatorial points. Thus, it will be appreciated that the individual rigid spherical members are closely packed in their disposition in the flexible armour plate arrangement.

Of importance is the depth to which the individual spheres 12—12 are cast in the flexible matrix substance 11. In this connection, it will be observed that the depth to which the matrix 11 is cast is equal to one-fourth of the diameter. Thus, the transverse dimension of the individual spheres is still increasing at the upper surface of the flexible matrix material. This depth of casting or potting may extend up to a point which is substantially equal to the diameter of the individual spheres, however, for best results, it has been found that a depth of casting equal to about ¼ of the diameter is preferred.

The individual smaller spheres 13—13 are not essential or critical to the general effectiveness of the armour plate. In this connection, however, they are provided in order to present a more uniform surface which is free of any significant void area through which a small projectile could travel without striking one of the individual rigid spherical members 12—12. They are held in place by an adhesive substance, and preferably have a diameter equal to about ½ the diameter of the cast-in-place spheres 12—12.

Figure 3:
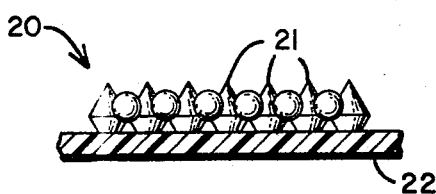
FIG. 3 is a perspective view of a modified form of thin flexible lightweight armour plate, a portion being shown in a vertical section taken along the line and in the direction of the arrows 3—3 of FIG. 4.
Figure 4:
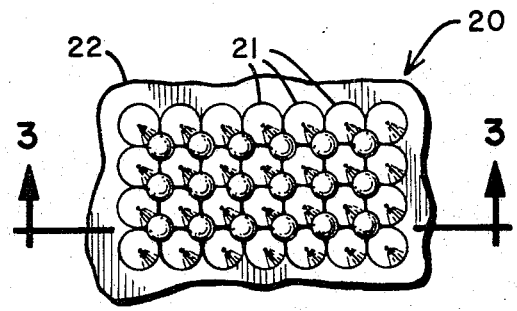
FIG. 4 is a top plan view of the armour plate shown in FIG. 3.

Turning now to the flexible armour plate shown in FIGS. 3 and 4, the materials utilized are the same as those utilized in connection with the armour plate shown in FIGS. 1 and 2, the difference being the configuration or form of the individual rigid members. The armour plate means 20 shown in FIG. 3 employs a plurality of conically shaped members 21—21 which are disposed in mutually adjacent relationship as indicated in connection with the armour plate of FIGS. 1 and 2, these conical members being retained in the flexible matrix base 22.

As indicated in the drawings, the individual members 21—21 are in the form of a pair of conical elements disposed in back-to-back relationship, one with another. The individual elements are, as indicated, in contact along the point of greatest diameter. Also, as is indicated, the depth of the matrix material is substantially equal to about ¼ of the overall height of the back-to-back conical elements. If desired, a smaller conical element could be placed in the interstitial areas existing between individual conical elements 21—21, however, such a member may necessarily be employed only where protection is desired from extremely small projectiles.

For protection against small-arms fire such as, for example, .22 caliber up to about .35 caliber rifles and the like, a spherical diameter of about 1 inch cast in place in a flexible polyurethane matrix of one-quarter inch thickness has been found to be effective, and the over-all axial length of the cones 21—21 shown in FIGS. 3 and 4 may correspondingly be in the range of about 1 inch. Each of these provides adequate protection against the indicated rifle fire.

Figure 5:
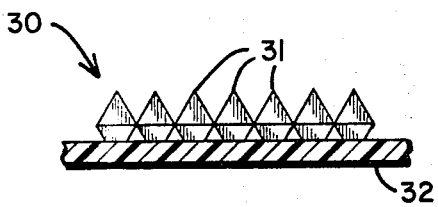
FIG. 5 is a perspective view of still another modification of the thin flexible lightweight armour plate of the present invention, a portion of FIG. 5 being shown in a vertical sectional view taken along the line and in the direction of the arrows 5—5 of FIG. 6.
Figure 6:
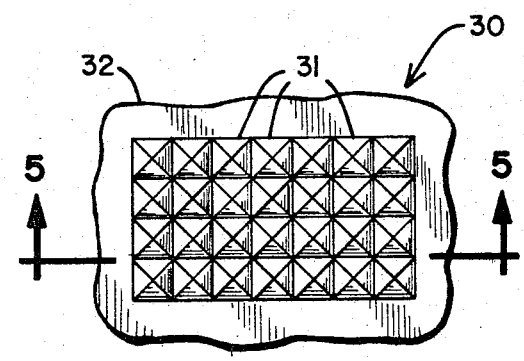
FIG. 6 is a top plan view of the armour plate shown in FIG. 5.

Reference is made to FIGS. 5 and 6 of the drawings, wherein an armour plate generally designated 30 is shown, this armour plate including a plurality of individual solid pyramids 31—31 cast in a flexible matrix 32. Again, as previously indicated, the materials employed will be essentially the same as those employed in the apparatus shown in FIGS. 1 and 2. The depth to which the flexible matrix material is cast is again equivalent to about ¼ of the over-all height of the individual pyramid units. These pyramids are preferably arranged in back-to-back relationship in order to provide a continuous structure with an expanding transverse area in the cast zone, and a decreasing transverse area in the exposed zone. The pyramids provide the outwardly contoured configuration which is generally desired in these armour plate materials.

It has been indicated that the various forms or configurations utilized provide an exposed surface which is effectively outwardly contoured. This is equally true for the spherical materials used in the modification of FIGS. 1 and 2, the back-to-back conical members used in the apparatus of FIGS. 3 and 4, and the pyramids used in back-to-back relationship shown in the material of FIGS. 5 and 6.

As has been previously indicated, the materials utilized are preferably sufficiently hard to withstand the original force of the projectile to which the armour plate is exposed. For rifle fire, as has been indicated, alumina ceramic having a density between about 3 and 4 has been found to be satisfactory. This high density alumina is available as a grinding media, and is commercially available, for example, from the Coors Porcelain Company of Golden, Colo. under their code number AD–85. Thus, any material which is sufficiently rigid or hard to withstand the original force of the projectile will, in turn, be sufficient to turn or deflect this projectile and thus cause it to spend its energy in the mass of the armour plate. For harder projectiles, a more dense or harder material may be employed, such as, for example, silicon carbide or the like. Unfortunately, the weight factor of silicon carbide renders it less desirable than that of the lighter weight alumina ceramics.

It will be observed that any projectile approaching the lightweight armour plate will normally strike it along a contoured or curved surface. The contoured surface is effective in deflecting the path of the projectile and thereby providing a larger surface area for absorption of energy.

In the preparation of the high density alumina grinding media or balls set forth hereinabove, the balls are built up from a relatively high number of thin, superimposed layers or films. The green material as built up from these superimposed layers is then fired to cure at the appropriate temperature. It has been found that these thin superimposed layers are valuable in dissipating the energy of impact from the projectile.

It will be appreciated that the specific examples set forth herein are for purposes of illustration only, and there is no intention of limiting the scope of the invention to these specific embodiments alone. Obviously, those skilled in the art may depart from these specific examples without actually departing from the spirit and scope of the present invention.

I claim:
1. Flexible armour plate means comprising:
   (a) a flexible matrix film having first and second substantially parallel surfaces with a certain predetermined thickness therebetween;
   (b) a plurality of rigid spherical members of substantially uniform diameter having rigid surfaces and being embedded in and retained in said flexible matrix material and consisting of an alumina ceramic having a density of between about 3 and 4; and
   (c) said rigid members being cast in said flexible matrix film with each member being in surface contact with each of its neighbors and being cast to a depth of substantially one-fourth of the diameter of said rigid spherical members.

2. The flexible armour plate means as defined in claim 1 being particularly characterized in that:
   (a) spheres of a diameter equal to substantially one-half the diameter of said rigid spherical members are disposed in the interstitial area between mutually adjacent individual rigid spherical members.

3. The flexible armour plate means as defined in claim 2 being particularly characterized in that said flexible matrix film comprises a polyurethane plastic having a specific gravity of between about 1 and 2.

References Cited

UNITED STATES PATENTS

| | | | |
|---|---|---|---|
| 1,463,498 | 7/1923 | Burgess | 161—404 |
| 2,430,534 | 11/1947 | Rodli | 161—162 |
| 2,630,616 | 3/1953 | Robinson | 161—168 |
| 2,768,919 | 10/1956 | Bjorksten et al. | 161—404 |
| 3,288,618 | 11/1966 | Devries | 161—168 |

MORRIS SUSSMAN, Primary Examiner

U.S. Cl. X.R.

161—162, 168, 404; 109—24, 49.5; 89—36